(12) United States Patent
Czetto, Jr.

(10) Patent No.: US 6,319,862 B1
(45) Date of Patent: Nov. 20, 2001

(54) PROTECTIVE MULTILAYER ARMOR CONSTRUCTION

(76) Inventor: Paul Czetto, Jr., 164 Cocoa Dr., Tavernier, FL (US) 33070

( * ) Notice: Subject to any disclaimer, the term of this patent is extended or adjusted under 35 U.S.C. 154(b) by 0 days.

(21) Appl. No.: 09/356,675

(22) Filed: Jul. 19, 1999

(51) Int. Cl.$^7$ .......................... B32B 27/04; B32B 27/12; B32B 3/06

(52) U.S. Cl. .......................... 442/135; 442/134; 428/102; 428/911

(58) Field of Search .................... 428/102, 911; 442/134, 135

(56) References Cited

U.S. PATENT DOCUMENTS 5,677,029 * 10/1997 Prevorsek et al. .................. 428/113
5,723,201 * 3/1998 Czetto, Jr. .......................... 428/181

* cited by examiner

Primary Examiner—Elizabeth M. Cole
Assistant Examiner—Ula C. Ruddock

(57) ABSTRACT

A protective armor construction which reduces blunt action trauma and provides excellent penetration resistance, includes multiple layers arranged in serial relation between the front and back. These layers include a first plurality of layers of a penetration resistant material fabricated of high strength, e.g., aramid, fibers. These layers are secured together at the peripheral edge, e.g., by sewing, and are backed by a first plurality of backing layers of a thermoplastic polyester extrudable in sheet form, such as polyethyleneterephalate. Next is a further plurality of layers of a penetration resistant material fabricated of high strength fibers. These layers are disposed in serially contacting, unsecured relation so that the layers can individually flex and expand in response to bullet impact. These layers are backed by a further plurality of layers of an extrudable thermoplastic material.

12 Claims, 1 Drawing Sheet

US 6,319,862 B1

PROTECTIVE MULTILAYER ARMOR CONSTRUCTION

FIELD OF THE INVENTION

The present invention relates to body armor constructions and, more particularly, to an improved body armor construction which, among other important advantages, reduces the blunt action trauma produced by a projectile, e.g., a bullet or the like.

BACKGROUND OF THE INVENTION

In my U.S. Pat. No. 5,723,201, and my co-pending application Ser. No. 09/266,842, filed on Mar. 12, 1999, the subject matter of which is hereby incorporated by reference, there are disclosed a penetration resistant protective armor constructions which afford a number of important advantages. Although the armor construction of my patent certainly serves its intended purpose and, insofar as I am aware, does so in a manner that is superior to all body armor presently available on the market, the present invention concerns further improvements in such armor constructions.

As discussed in the above-mentioned application Ser. No. 09/266,842, one important aspect of the damage done by a bullet upon impact is referred to as blunt action trauma. In general, this is the impact trauma produced by the bullet in the immediate area of impact, in addition to the penetration damage. In a clay test target used to simulate the body, this trauma is manifested by a substantial blunt deformation of the clay around the entry site of the bullet. It will be appreciated that in some instances this blunt trauma can be more significant than the damage done by the passage of the bullet itself into and/or through the body depending, for example, on whether the bullet strikes a vital organ or the like.

SUMMARY OF THE INVENTION

In accordance with the invention, a protective armor construction is provided which reduces blunt action trauma, and provides excellent penetration resistance, while being relatively inexpensive to manufacture. According to the invention, a protective armor construction is provided which comprises, arranged in serial relation between the front and back of the armor construction: a first plurality of layers of a penetration resistant material fabricated of high strength fibers, the layers being secured together at the peripheral edges thereof; a first plurality of backing layers of a thermoplastic polyester extrudable in sheet form; a further plurality of layers of a penetration resistant material fabricated of high strength fibers, the further plurality of penetration resistant layers being disposed in serial contacting, unsecured relation; and a further plurality of layers of a thermoplastic material extrudable in sheet form.

Advantageously, said first plurality of layers of a penetration resistant material are sewed together by stitching extending around the periphery of the layers in adjacent spaced relation to said peripheral edges. Preferably, the stitching is spaced from between about ⅛ inch to 1 inch from the peripheral edges.

Preferably, the backing layers of thermoplastic polyester include an adhesive coating affixing the corresponding backing layer to an adjacent layer.

In an important embodiment, the penetration resistant material is comprised of high strength, high modulus aramid fibers and the thermoplastic polyester comprises a long chain synthetic polymer of dihydric alcohol and dibasic acids or esters thereof. Preferably, the synthetic polymer comprises a polyester of dihydric alcohols and aromatic dicarboxylic acids or esters. More preferably, the polyester comprises polyethyleneterephalate. In an advantageous embodiment, the at least one backing sheet of polyethyleneterephalate has an adhesive coating thereon.

Advantageously, the first plurality of layers of penetration resistant material comprises at least four layers, with eight layers being employed in a beneficial implementation.

Advantageously, the first plurality of backing layers comprises at least three layers, with five layers being employed in a beneficial implementation.

Advantageously, the further plurality of penetration resistant layers comprises at least three layers, with four layers being employed in a beneficial implementation.

Advantageously, the further plurality of backing layers comprises at least three layers.

In accordance with a further aspect of the invention, a protective armor construction is provided which comprises, arranged in serial relation from front to back: a first plurality of layers of a penetration resistant material secured together so as to provide blunting the shape of a projective striking the layers, the penetration resistant material comprising high strength aramid fibers; a first backing sheet of polyethyleneterephalate adhered to the rearmost layer of the first plurality of layers; at least one further backing sheet of polyethyleneterephalate adhered to the first backing sheet; a second plurality of layers of a penetration resistant material arranged in unsecured serial relation to one another so as to flex and expand in response to striking thereof by a projectile, the penetration resistant material of the second plurality of layers comprising high strength aramid fibers; a second backing sheet of polyethyleneterephalate adhered to the rearmost layer of the second plurality of layers; and at least one additional backing sheet of polyester adhered to the second backing sheet.

Further features and advantages of the present invention will be set forth in, or apparent from, the detailed description of preferred embodiments thereof which follows.

DESCRIPTION OF THE PREFERRED EMBODIMENTS

Figure 1:
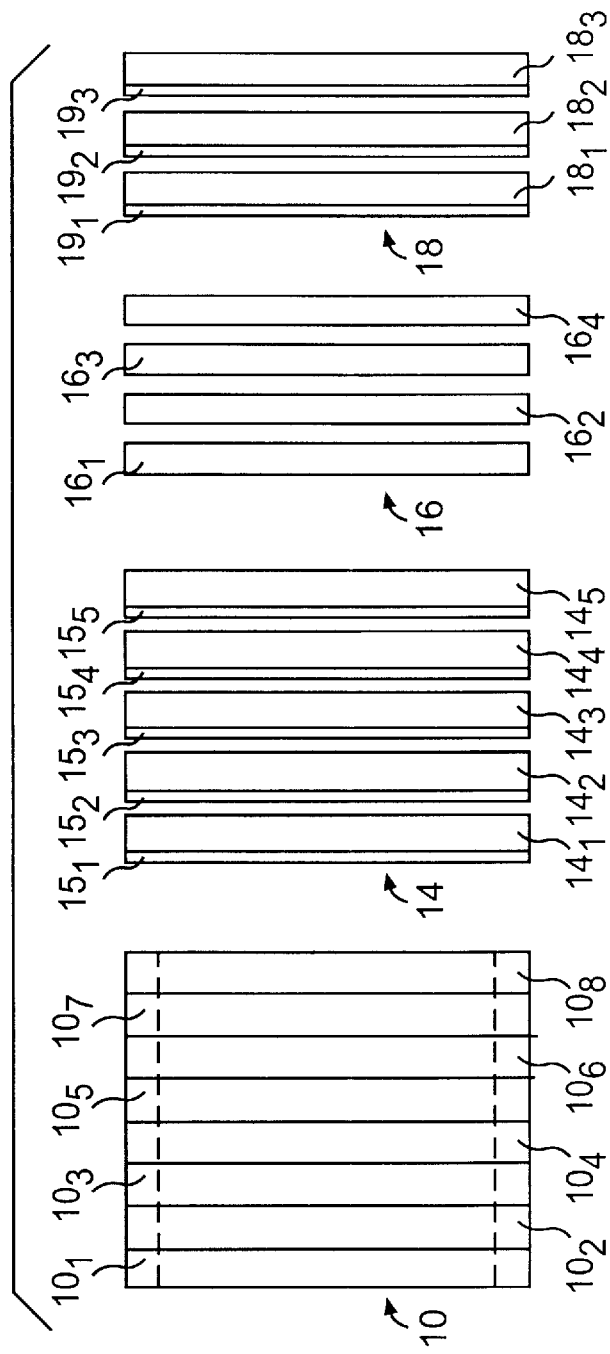
FIG. 1 is an exploded side elevational view of important elements of a protective body armor construction in accordance with one preferred embodiment of the invention.

Referring to FIG. 1, there is shown an exemplary preferred embodiment of the body armor construction of the invention. In general, FIG. 1 shows the important layers or sheets which make up or form the body armor construction. In this exemplary embodiment, the layers or sheets are arranged in serial relation from front to back beginning from the left of FIG. 1 to form a sandwich construction when assembled together.

The aforementioned sandwich construction includes a first group 10 of a plurality of layers or plies of a penetration resistant material. In FIG. 1, the first group 10 includes eight layers denoted $10_1$, $10_2$, $10_3$, $10_4$, $10_5$, $10_6$, $10_7$, and $10_8$, respectively. It will be appreciated that the layer $10_1$ is located or disposed at the front of the protective armor construction and the other layers are disposed therebehind, and also that additional layers, e.g., covering layers, may be included in the construction. Moreover, in accordance with one important aspect of the invention, all of the layers of the first group are stitched, sewn or otherwise affixed together, preferably stitching or by sewing the layers together around the edges thereof by stitching indicated at 12. In an advantageous implementation, the stitching 12 is spaced between about ⅛ inch to 1 inch from the edge of the layers of group 10 and, in an embodiment that has been shown to work well this spacing is about ½ inch. It will be appreciated that the layers of group 10 can be considered to be a sub-unit of the overall construction.

In an especially advantageous embodiment, the material used for first group 10 of penetration resistant layers is that sold by Allied Signal, Inc. of Morristown, N.J. under the trademark GOLD FLEX. GOLD FLEX is a high strength synthetic fiber impregnated in a partially cured resin for use in ballistic material. Good results have also been obtained with materials sold under the trademark SPECTRA for woven fabrics and also available from Allied Signal Inc. Other penetration resistant materials that can be used include that sold under the trademark TWARON CT2000 for aramid fibers available from Akzo Chemical Company of the Netherlands as well as materials made from KEVLAR (p-phenyleneterephthalamide) and other high strength high modulus aramid fibers. In addition, a non-woven reinforced plastic such as SPECTRA SHIELD, also available from Allied Signal Inc., may also be used in some applications. In this regard, it will be appreciated that a non-woven plastic such as SPECTRA SHIELD may be more useful in applications involving armored vehicles and the like.

Returning to FIG. 1, the next group of layers is a group 14 of plastic sheet material. The layers of second group 14 preferably comprise an adhesive layer on a plastic backing layer, and in the illustrated embodiment, comprise five backing layers $14_1$, $14_2$, $14_3$, $14_4$, and $14_5$, each having corresponding adhesive layer $15_1$, $15_2$, $15_3$, $15_4$, or $15_5$.

Considering the layers or sheets of the second group 14 in more detail, these layers are preferably made of a thermoplastic polyester base layer or backing with an adhesive layer thereon, with the base layer advantageously comprising a long chain synthetic polymer of dihydric alcohol and dibasic acids or esters thereof that are extrudable as sheets. Preferably the base layer comprises polyesters of dihydric alcohols and aromatic dicarboxilic acids and esters such as polyethyleneterephalate and polybutyleneterephalate. A particularly preferred commercial product is the material sold by Dupont under the trademark MYLAR which comes with an adhesive coating that is exposed by peeling off a covering peel-off strip.

The backing sheets or layers of the second group 14 further flatten out the striking bullet or projectile and also perform an important function in combination with woven plastic penetration resistant layers of the first group. In particular, the backing sheets also reduce the blunt action trauma discussed above by spreading out the effect of the bullet impact over a wider or larger area. It is believed that one reason for this is that the preferred materials used for the penetration resistant layers generally comprise directional strands or fibers without a cross weave, rather than, e.g., criss-crossing randomly oriented fibers which provide strength in all directions, and that a bullet will cause parting of these strands or fibers, i.e., will force the strands apart, so that the impact force and the resultant blunt force trauma, are more narrowly focussed than would normally be expected, and thus more powerful and damaging.

Whatever the failings of the penetration resistant material, tests have shown that the backing sheets of MYLAR or the like serve to spread out the effect of the bullet impact over a wider area and thus reduce blunt action trauma. In addition, the adhesive layer on the backing sheet is believed to enhance this effect, i.e., the reduction of blunt action trauma, by virtue of its adherence to the adjacent layer or sheet.

Returning to FIG. 1, the next or third group 16 of layers comprises a further plurality of penetration resistant layers. A key aspect of the invention is that this group of layers are unsecured to one another, i.e., these layers are arranged in serial, contacting relation but are not stitched, sewn or otherwise affixed to one another. This construction enables the layers of group 16 to flex and expand separately and this dramatically neutralizes or muffles a striking bullet by, inter alia, effectively extending the travel path thereof in a manner similar to the folded layers of my previous patent, U.S. Pat. No. 5,723,201. Thus, each of the layers of group 16 can also be considered to be a sub-unit.

Finally, a fourth group 18 of layers is provided which comprise plastic backing sheets corresponding to those discussed above and one preferably made of the materials described previously. In the embodiment illustrated, three sheets $18_1$, $18_2$ and $18_3$ are provided with respective adhesive coatings $19_1$ $19_2$ and $19_3$. The sheets of group 18 back up the loose penetration resistant layers of the third group 16 and limit bullet travel. The rearmost layer $16_4$ of layers 16 and first layer $18_1$ secured thereto can also be considered to be a sub-unit as can layer $16_4$ together with layers $18_1$, $18_2$ and $18_3$.

Figure 3:
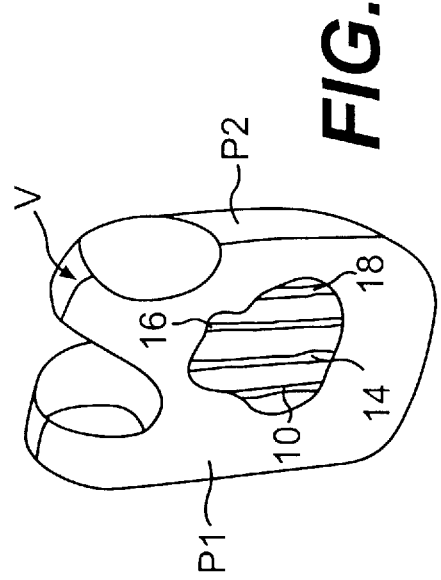
FIG. 3 is a perspective view of a protective vest incorporating a protective body armor construction in accordance with the invention.
Figure 2:
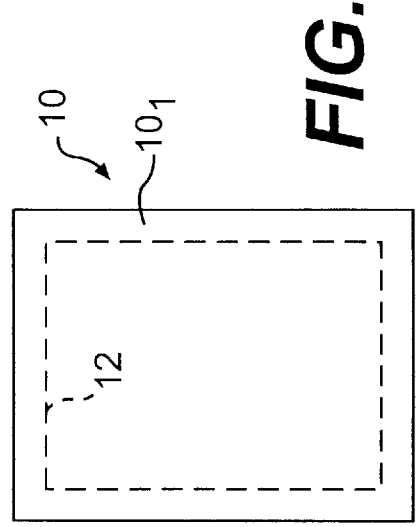
FIG. 2 is a front elevational view of the first layer of the body armor construction of FIG. 1, showing the stitching pattern.

Referring to FIG. 3, the protective armor construction of the invention is shown as incorporated in a conventional "bulletproof" vest V. Vest V can, of course, take a number of different forms and, in the embodiment illustrated, is of a sleeveless slipover type including front and back panels P1 and P2. In this embodiment, front panel P1 is of a construction corresponding to that described above including the stitched penetration resistant layer group 10, the first group 14 of backing sheets or layers, the unsecured penetration resistant layer group 16 and the final group 18 of backing sheets.

In addition to the excellent protective properties of the armor construction of the invention including improved bullet stopping and reduction of blunt action trauma, the armor construction has a superior "areal density,", i.e., weight per area ratio.

Although the invention has been described above in relation to preferred embodiments thereof, it will be understood by those skilled in the art that variations and modifications can be effected in these preferred embodiments without departing from the scope and spirit of the invention.

What is claimed is:

1. A protective armor construction having a front and back and comprising multiple layers arranged in several relation between the front and back of the armor construction, said multiple layers including: a first sub-unit comprising at least one layer of a penetration resistant material fabricated of high strength aramid fibers; and a further sub-unit comprising at least one further layer of a penetration resistant material fabricated of high strength aramid fibers, said at least one further layer being disposed in unsecured relation to said first sub-unit and including a front facing side unsecured to any of said multiple layers; and said further sub-unit further including at least one polyester layer comprised of a thermoplastic polyester comprising a long chain synthetic polymer of dihydric alcohol and dibasic acids or esters thereof, said polyester layer including an adhesive coating on one side thereof, said one side of said polyester layer facing toward the front of the armor construction and the adhesive coating on said one side of said at least one polyester layer being secured to a back facing side of said further layer of penetration resistant material.

2. A protective armor construction as claimed in claim 1 wherein said at least one layer of penetration resistant material of said first sub-unit comprises a plurality of layers of said penetration resistant material secured together by stitching extending around the periphery of the layers in adjacent spaced relation to said peripheral edges.

3. A protective armor construction as claimed in claim 2 wherein the stitching is spaced from between about 1/8 inch to 1 inch from the peripheral edges.

4. A protective armor construction as claimed in claim 3 wherein said stitching is spaced from said peripheral edges by a peripheral spacing of substantially 1/2 inch.

5. A protective armor construction as claimed in claim 1 wherein synthetic polymer comprises a polyester of dihydric alcohols and aromatic dicarboxylic acids or esters.

6. A protective armor construction as claimed in claim 5 wherein the polyester comprises polyethyleneterephalate.

7. A protective armor construction as claimed in claim 1 wherein said at least one layer of penetration resistant material of said first sub-unit comprises at least four layers of a penetration resistant material.

8. A protective armor construction as claimed in claim 1 wherein said further plurality of layers of a penetration resistant material comprises at least three of said layers.

9. A protective armor construction as claimed in claim 1 wherein said further plurality of backing layers comprises at least three of said layers.

10. A protective armor construction having a front and back and comprising multiple layers arranged in serial relation between the front and back of the armor construction, said multiple layers including: a plurality of layers of a penetration resistant material fabricated of high strength aramid fibers, said layers having peripheral edges and being secured together at said peripheral edges to form a first sub-unit; and at least one further sub-unit comprising at least one further layer of a penetration resistant material fabricated of high strength aramid fibers, said at least one further layer being disposed in unsecured relation to said first sub-unit and including a front facing side unsecured to any of said multiple layers, said further sub-unit further comprising a plurality of polyester layers comprised of a thermoplastic polyester comprising a long chain synthetic polymer of dihydric alcohol and dibasic acids or esters thereof, said polyester layers including an adhesive coating on one side thereof and said one side of each of said polyester layers facing toward the front of the armor construction, the adhesive coating on said one side of a frontmost polyester layer of said plurality of thermoplastic polyester layers being secured to a back facing side of said further layer of penetration resistant material and the adhesive coating of each of said polyester layers other than said frontmost layer being secured to back facing side of an adjacent polyester layer of said polyester plurality of layers so as to form said further sub-unit.

11. A protective armor construction as claimed in claim 10 wherein said plurality of layers of said penetration resistant material are secured together by stitching extending around the periphery of the layers in adjacent spaced relation to said peripheral edges.

12. A protective armor construction as claimed in claim 10 wherein said at least one further layer of a penetration resistance material comprises at least two layers.

\* \* \* \* \*